(12) United States Patent
Cheng et al.

(10) Patent No.: US 6,866,730 B2
(45) Date of Patent: Mar. 15, 2005

(54) METALLIC-BASED ADHESION MATERIALS

(75) Inventors: Yang-Tse Cheng, Rochester Hills, MI (US); Wangyang Ni, East Lansing, MI (US); Leonid Charles Lev, West Bloomfield, MI (US); Michael J. Lukitsch, Port Huron, MI (US); David S. Grummon, E. Lansing, MI (US); Anita M. Weiner, West Bloomfield, MI (US)

(73) Assignees: General Motors Corporation, Detroit, MI (US); Michigan State University, East Lansing, MI (US)

( * ) Notice: Subject to any disclaimer, the term of this patent is extended or adjusted under 35 U.S.C. 154(b) by 55 days.

(21) Appl. No.: 10/394,475

(22) Filed: Mar. 21, 2003

(65) Prior Publication Data

US 2004/0185291 A1 Sep. 23, 2004

(51) Int. Cl.[7] .......................... C22C 45/00; B23K 35/22
(52) U.S. Cl. ................. 148/516; 148/537; 148/402; 148/527; 228/120; 228/262.3; 228/262.4; 228/262.6
(58) Field of Search ................ 148/516, 527, 148/537, 402; 228/120, 262.3, 262.4, 262.6

(56) References Cited

U.S. PATENT DOCUMENTS

| | | | | |
|---|---|---|---|---|
| 4,740,253 A | * | 4/1988 | Simpson et al. ............ 428/680 |
| 4,808,246 A | * | 2/1989 | Albrecht et al. ............ 148/527 |
| 5,431,506 A | * | 7/1995 | Masunaga .................... 403/271 |
| 5,597,470 A | * | 1/1997 | Karavakis et al. .......... 205/118 |
| 5,599,468 A | * | 2/1997 | Mako et al. ............ 219/121.14 |
| 5,687,995 A | * | 11/1997 | Mori et al. ............... 285/381.2 |
| 5,772,105 A | * | 6/1998 | Zadno-Azizi et al. ....... 228/175 |
| 6,329,069 B1 | * | 12/2001 | Azizi et al. ................. 428/600 |
| 6,475,235 B1 | * | 11/2002 | Jayaraman ................. 623/1.15 |
| 6,620,192 B1 | * | 9/2003 | Jalisi ......................... 623/1.15 |
| 6,625,848 B1 | * | 9/2003 | Schneider .................... 16/436 |
| 6,637,110 B2 | * | 10/2003 | Jee ........................ 29/890.031 |
| 6,718,752 B2 | * | 4/2004 | Nesbitt et al. ................ 60/204 |

OTHER PUBLICATIONS

Wangyang Ni, Yang–Tse Cheng and David S. Grummon, *Applied Physics Letters*,, 3310–3312 (2002).

C.M. Wayman, *MRS Bulletin*, 49–56 (Apr. 1993).

* cited by examiner

*Primary Examiner*—Deborah Jones
*Assistant Examiner*—Jason Savage
(74) *Attorney, Agent, or Firm*—Kathryn A. Marra

(57) ABSTRACT

A material and method for adhering at least two materials that includes the step of interposing at least one intermediate layer between the two materials and associated adhesion material. The materials to be adhered exhibit at least one characteristic dissimilarity and the intermediate material interposed contains at least one shape memory alloy, the shape memory alloy capable of exhibiting -superelasticity.

39 Claims, 10 Drawing Sheets

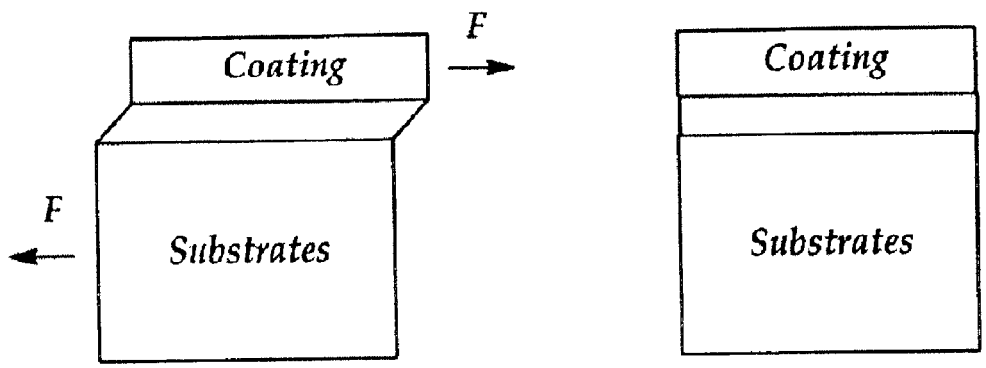
*Figure 14A*          *Figure 14B*
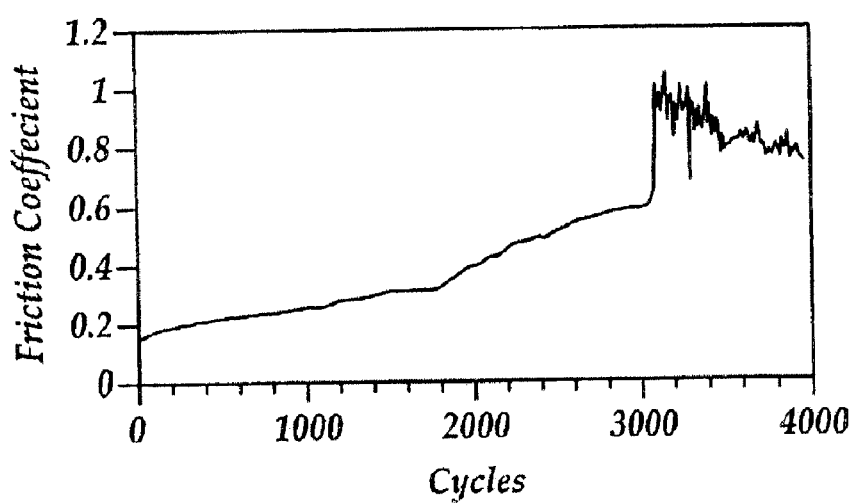
*Figure 15A*

METALLIC-BASED ADHESION MATERIALS

BACKGROUND

The present invention relates to metallic-based materials that can be interposed between dissimilar materials and improve adhesion therebetween. The present invention is also related to a method for adhering two layers of materials using an intermediate layer containing at least one shape memory alloy that exhibits superelastic effects as well as constructions including such materials.

Various materials have been proposed for achieving adhesion between dissimilar materials. One difficulty encountered in joining dissimilar materials is the differences between mechanical properties, such as elastic moduli and yield strengths of the respective materials. Dissimilar materials exhibiting modulus mismatches may produce shear stress parallel to material interfaces that can compromise adhesion effectiveness. Such shear stresses may result in crack propagation along the interface leading to the delamination. It has been found that such phenomena can occur even when a joint or laminate is under tensile loading.

Polymeric adhesives, commonly called glues, have been used to bond various surfaces together. These adhesives can be formulated to exhibit very large recoverable strain, strong chemical interaction with the bonding surfaces, and capability of storing large amounts of elastic energy before failure. Unfortunately, polymeric adhesive formulations typically exhibit very small elastic moduli and yield strength compared to materials such as metals, metals matrix composites, and ceramics to be bonded. Thus, when polymeric adhesives are employed to bond materials such as metals and ceramics, the large elastic modulus mismatch and the low yield strength of the polymeric glues at the interfaces presents significant opportunity for adhesion failure.

SUMMARY

The present invention is directed to a material and method for adhering at least two materials having at least one characteristic dissimilarity in their mechanical properties. In the method as disclosed herein, at least one intermediate layer is interposed between the two materials. The intermediate layer contains at least one shape memory alloy, which can exhibit superelastic behavior. The present invention is also directed to a multi-layer construction that includes a first layer composed of a material having a first characteristic, a second layer composed of a material having a second characteristics which has a value different from the first characteristic, and an intermediate layer interposed between the first and second layers. The intermediate layer contains at least one shape memory alloy which can exhibit superelastic behavior.

DESCRIPTION OF THE DRAWINGS

FIGS. 14A and 14B depict accommodation of the superelastic interlayer to strain in the interlayer and at the interface caused by elastic deformation;

FIGS. 15A and 15B are graphic results of coefficient of friction and wear track for the wear results of CrN—Al;

DETAILED DESCRIPTION

Figure 1:
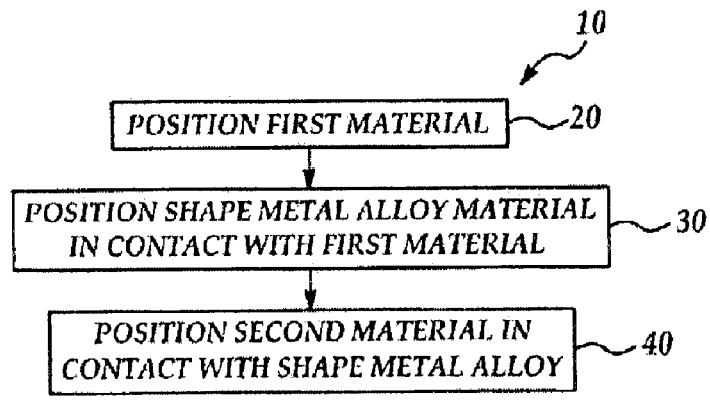
FIG. 1 is a process diagram outlining an embodiment of the invention as disclosed herein.

The present invention is directed to a material and method for adhering at least two materials that exhibit at least one characteristic dissimilarity. The present invention is also directed to a multi-layer construction that includes a first material layer composed of a material having a first characteristic, and a second material layer composed of a material having a second characteristic. The first and second characteristics relate to different mechanical properties, such as, for example, at least one of elastic modulus, material hardness, internal material stress, and yield strength. In the method disclosed herein, an intermediate layer containing a shape memory alloy is interposed between the first and second layers. The shape memory alloy is one that can exhibit superelastic behavior. The present invention is also directed to a construction that includes an intermediate layer interposed between first and second material layers. The first and second material layers are composed of materials that have at least one characteristic mechanical property that differs between the two respective materials. The intermediate layer contains at least one shape memory alloy that can exhibit superelastic behavior.

As used herein, the herein "shape memory alloy" or SMA is broadly defined as a metal-based alloy having a reversible solid-state transformation typically known as a martensitic transformation. Such materials typically exhibit the shape-memory effect and superelasticity distinct from conventional metals and alloys. These materials may be ferrous or non-ferrous martensites. Such materials include, but are not limited to, iron-based alloys, copper-based alloys, and nickel-titanium alloys. Ferrous systems include, but are not limited, iron and at least one of manganese, silicon, chromium and nickel, such as iron-manganese-silicon alloys and iron-chromium-nickel alloys. Copper-based systems are typically derived from copper-zinc, copper-aluminum, and copper-tin systems. Copper systems include, but are not limited to, copper and at least one of zinc, aluminum and nickel, such as copper-zinc-aluminum alloys, copper-nickel-aluminum alloys, and copper-beryllium-aluminum alloys. Nickel based systems include, but are not limited to nickel and at least one of titanium, copper, niobium, palladium, zirconium, and hafnium.

Nickel-titanium systems may contain various amounts of nickel and titanium with the nickel and titanium being present in an intermetalic phase. Typically, concentrations of nickel-titanium shape memory alloys are approximately between 48 and 52 atomic % (i.e. at %) nickel. It is to be understood that the transformation temperature of the B2 structure to the martensitic phase that has a monoclinic B19' structure may be very sensitive to the nickel content. Transformation temperatures may range between −40° and +100° C. The nickel-titanium systems can also include a third element that can advantageously influence transformation temperature and affect hysteresis. Various tertiary elements can be present in the nickel-titanium alloy. These include, but are not limited to, at least one of copper, niobium, iron, chromium, cobalt, aluminum, molybdenum, gold, palladium, platinum, hafnium, and zirconium. Examples of tertiary nickel-titanium alloys include, but are not limited to, at least one of nickel-titanium-copper alloys and nickel-titanium-niobium alloys.

As defined herein, "superelasticity" and "superelastic behavior" is an isothermal event characterized by evidence of pseudo elastic behavior until a critical strain is reached. In shape memory alloys, the superelastic effect is the result of stress-induced martensitic phase transformation. A large strain of several percent can be accommodated by this stress induced martensitic phase transformation process. Upon releasing the stress, the reverse phase transformation occurs, which may result in the recovery of large strains and restoration of original dimensions. Further, stressing beyond the strain level that can be accommodated by stress-induced martensitic phase transformation results in deformation that mimics conventional plastic deformation. The elastic limit of conventional metals is less than 0.2 percent. The large recoverable strain of several percent in superelastic shape memory alloys gives rise to the terminology of "superelasticity".

The materials of choice will exhibit superelastic behavior above a phase transition temperature characteristic to the particular shape memory alloy. Phase transition temperatures between −40° C. and 120° C. are typical, and phase transition temperatures above ambient temperatures are preferred. As used herein "ambient temperature" Is employed to mean the temperature associated with the surroundings in which the resulting work place is to perform. This is typically 25° C. but may be lower depending on the end use application.

As depicted in FIG. 1, the method 10 of adhering at least two materials includes interpositioning of a compound containing a shape memory alloy between two materials having different characteristics. The method is broadly accomplished by positioning the first material, as at reference numeral 20. The material containing the shape memory alloy is positioned in contact with the first material, as at reference numeral 30. Typically, the material containing the shape memory alloy is positioned by a suitable deposition process or processes, or by other processes or procedures that provide the material containing the shape memory alloy in overlaying relationship with at least a portion of one surface of the first material. Once the shape memory alloy containing material is in position, the second material can be positioned in contact with the shape memory alloy, as at reference numeral 40. Positioning of the second material may be accomplished by any suitable method, including thin film deposition or the like.

In the method disclosed herein, the first and second materials to be joined exhibit at least one characteristic dissimilarity. As used herein, the term "characteristic dissimilarity" is defined as a physical characteristic or state inherent in the material and capable of exhibition when the resulting assembly is in a use condition. The characteristic of interest is one that milltates against adhesion of the first and second materials. Examples of such a characteristic dissimilarity include, but are not limited to, differing elastic moduli in the two respective materials, differing yield strengths in the two respective materials, differing residual stresses in the two respective materials, and differing thermal expansion coefficients in the two respective materials.

The difference in elastic moduli may be any value sufficient to produce a disassociation phenomenon sufficient to comprise joining of the first and second materials under standard use conditions without the presence of the intermediate layer as disclosed herein. Examples of such disassociation phenomena may include shear stress parallel to the material—material interface when the materials are so joined. Typically, differences in elastic moduli can be those greater than about 50 GPa. Differences in yield strength may be those that compromise adhesion between the respective materials. Differences in residual stress may be any amount that can result in delamination or adhesion failure between the two materials. Differing thermal expansion coefficients are those that can compromise the adhesion between the two respective material layers. It is to be understood that one or more characteristic differences may be exhibited between the first and second materials. Where multiple characteristic differences are exhibited, the characteristic difference for a given physical characteristic may be lower then that stated above prior to adhesion failure, given the cumulative effect of multiple characteristic mismatches.

Non-limiting examples of first and second materials that can be employed in an embodiment of the method include first and second metals exhibiting a differential in at least one of elastic, moduli and thermal expansion coefficients. Other examples include, but are not limited to metals joined to ceramics, metals joined to polymers, and metals joined to various metal matrix composites. Other suitable materials include those having characteristic differences in material hardness, as well as internal material stresses.

The first end second materials employed in the method and constructions as disclosed herein each can be composed of at least one of ceramic compounds, polymer composites, metal matrix composites, end various metals and metal alloys. In certain instances, at least one of the first and second materials may be suitable to form a substrate that can be further processed to provide a tribological surface. Examples of suitable first or substrate materials include materials containing ceramic compounds, polymer composites, metal matrix composites, and metals such as aluminums and aluminum alloys, magnesium alloys, and copper alloys. The second material layer may be composed of at least one of ceramic compounds, polymer composites, metal matrix composites, and metals such as aluminums and aluminum alloys, magnesium alloys, and copper alloys. It is also contemplated that the intermediate layer containing at least one shape memory alloy may be interposed between two metal materials having different characteristics, such as, for a example, two different aluminum alloys.

The intermediate layer may be interposed between layers of equal thickness or may be interposed between a substrate and a thin film layer. Examples of materials used as the second material in thin film applications include those previously mentioned materials that will exhibit characteristics of high hardness. Examples of such materials exhibiting high hardness also include formulations that contain at least one of a carbon-based coating material, a nitride-based coating material, a carbide-based coating material, and an oxide-based coating material. Such materials may be present in thicknesses ranging between about 0.5 nanometers and 100 microns.

Such high hardness materials may be applied over a variety of substrates for various end use applications where a hardened, potentially tribological surface is required. The substrates over which such materials may be applied are generally "soft" substrate materials. The term "soft," as used herein in regard to the substrate, refers to a material which is prone to scratching, denting, or other surface wear and/or abrasion. Examples of suitable hardness enhancing coatings include nitride-based materials such as chromium nitride (CrN), as well as materials such as diamond-like-carbon, diamond, titanium-nitride, aluminum nitride, titanium-aluminum-nitride, zirconium-nitride, silicon carbides, tungsten-carbide, and aluminum-oxides having hardness greater than 5 GPa.

It is also contemplated that the method of the present invention can be employed where the application of the second material results in a highly stressed material. The highly stressed material may result, for example, when coatings are vapor deposited on the surface of various machine tools or machine tool elements. Thus, the materials containing shape memory alloys may be interposed between machining part materials, such as, for example, high strength steel and tungsten-carbide and surface coating materials, such as, for example, diamond-based coating materials, borides, nitrides, oxides and the like.

Figure 2:
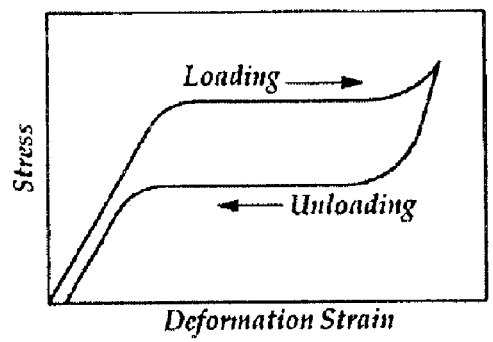
FIG. 2 is a graphic depiction of a stress-strain curve of a superelastic shape memory alloy in tension.

The shape memory alloys employed in the method disclosed herein will exhibit a superelastic effect under ambient temperature of operation for the associated resulting mechanism or work piece. The temperature range for associated work pieces can be broadly defined as between −40° and 400° C. It is to be understood that specific work pieces and constructions will have use temperatures that are more narrowly defined. Thus the shape memory alloy employed will be one that exhibits a phase transition temperature below general use conditions expected for the resulting part depending on the specific application or ambient temperature of operation, the shape memory alloy employed can exhibit superelasticity above a suitable given temperature point or temperature range. By way of a nonlimiting example, the superelasticity effect of a NiTi shape memory alloy is considered to be between 20° C. and 100° C. Thus, end-use parts having an expected service temperature at or above this particular range could be advantageously constructed employing this material (e.g. NiTi). It is to be understood that the phase transition temperature range associated with superelasticity for a given material employed in the intermediate layer can be modified, altered or adjusted through the use of various dopants or the like. An illustrative example of superelastic behavior is set forth in FIG. 2.

The intermediate layer may have any suitable thickness relative to the first and second material layers. As disclosed herein, the intermediate layer may be applied as a thin or thick film having a thickness ranging between 10 nanometers and about 500 microns. In thin film applications, the intermediate layer thickness may be less than 200 microns, with non-limitative thicknesses ranging between 10 nanometers and 5 microns.

It has been found, quite unexpectedly, that shape memory alloys with superelasticity interposed between two materials having at least one characteristic dissimilarity will promote adhesion between the dissimilar materials. The intermediate layer may be positioned on a face of the first or substrate layer by any suitable process which will permit or produce at least some interfacial reaction, such as, for example, by heat, mechanical friction, laser treatment, and welding. Administration of the intermediate layer may be by any suitable deposition process that will provide a layer containing the SMA at a thickness desired for the particular end use application. Such processes include, but are not limited to vapor deposition, plasma spray, and the like, which will provide an intermediate layer having a thickness between 0.5 nanometers and 500 microns. In one embodiment, the intermediate layer has a thickness between 1 nanometer and 100 microns, and in another embodiment, the intermediate layer has a thickness between about 100 nanometer and 5 microns.

The second or overlying layer may have any suitable thickness and may be positioned in overlying relationship to the first layer with the intermediate layer interposed therebetween. The second or overlying layer may be a metal, ceramic, metal matrix composite, polymer or the like. Further, the second or overlying alyer may be positioned by any suitable positioning means which includes, but is not limited to, vapor deposition, sputtering and the like, as may be employed in the production of thin film layers. It is also contemplated that other application methods may be employed to provide a second layer having the thickness and pattern as required or desired. Thin film deposition techniques may produce internal stresses which, if unaddressed, may lead to delamination of the deposited layer. It has been found, quite unexpectedly, that deposition of the thin film layer (as the second layer) on an intermediate layer containing a shape memory alloy with superelasticity may mitigate the internal or inherent stresses caused by vapor deposition processes.

It has also been found that the intermediate layer serves to mitigate or mediate stresses caused by tensile loads and variations produced as a result of the varying elastic modulus of the two disparate layers.

In order to more fully understand the process of the present invention, the following illustrative examples are provided. These examples are to be considered illustrative of embodiments of the present invention and in no way limit the scope or breadth of the invention herein claimed.

EXAMPLE I

In order to ascertain the effectiveness of interposed shape memory alloys in multilayer constructions, a layer of austenitic NiTi was grown on an aluminum substrate, followed by the deposition of a CrN hard coating. The indentation, adhesion, and wear behavior of this structure were compared with the CrN—Al samples and with a sample having a martensitic NiTi interlayer.

The substrate material employed was 6061-T6 aluminum plates with dimensions of 20 mm×20 mm×3 mm. The aluminum plates were polished by diamond paste through 25 micron.

A NiTi thin film was deposited on the prepared aluminum plates by a DC magnetron sputtering process. The base pressure achieved was better than $2.7 \times 10^{-6}$ Pa. The austenitic NiTi thin film was deposited from a Ni49.8at % Ti target; while the martensitic NiTi thin film was deposited from a Ni48at % Ti target. The target was presputtered for 30 minutes prior to sputter deposition to obtain stable plasma. The working pressure was 0.33 Pa and the working distance between the target and the substrate was 64 mm. The substrate temperature was controlled by a built-in furnace within the chamber. Argon of 99.99% purity was used for the generation of the plasma.

The NiTi film was deposited at a substrate temperature of 300° C. for 60 minutes at a deposition rate of 1.1 nm/s. The film was post-annealed at 550° C. for 60 minutes to crystallize the deposited NiTi film and obtain the desired phase transformation temperature. The thickness of the film was determined by measuring a step at the edge of the masked area using a WYKO surface profilometer.

The CrN coating was made by depositing from a chromium target of 99.99% purity in a nitrogen-containing argon environment. The base pressure of the system was $8 \times 10^{-4}$ Pa and the pressure during the deposition was 0.13 Pa. The gas was a mixture of 99.999% pure argon and 99.99% pure nitrogen. The nitrogen gas flow rate was 46 sccm. The CrN film was deposited at 4 Amps with 150 V bias applied to the substrate. The film thickness was 1 micron.

The composition of the NiTi film was measured by wet chemical analysis. The characteristic phase transformation temperature of the NiTi thin film was determined using a TA Instrument DSC 2929 Modulated differential scanning calorimeter (DSC). The temperature ranged from −50° C. to 175° C. under a controlled heating/cooling rate of 50° C./min. X-ray diffraction (XRD) measurements were carried out on a Siemens D500 diffractometer using Cu—K alpha radiation at 40 kV voltage and 30 mA current.

Analysis indicated that NiTi thin film of 4 micron thickness was deposited on the 6061-T6 aluminum substrate. Specimen S1 had a film made from a Ni49.8at %-Ti target and was found to be Ni-rich. The film composition was Ni51.8at %-Ti48.2at %. Specimen S2 was made from a Ni48at %-Ti target and was found to be slightly Ti-rich. The film composition was Ni49.5at %-Ti. About 1.5 to 2at % of TI was lost during the sputtering process.

Figure 3:
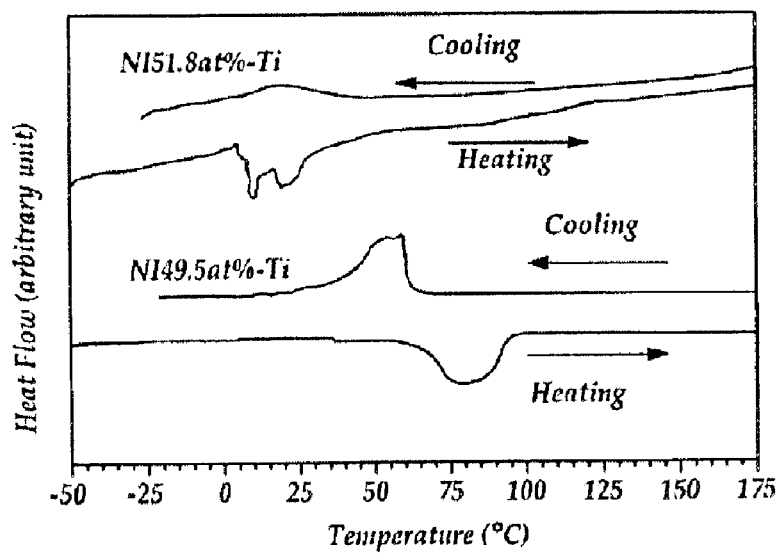
FIG. 3 is a graphic depiction of DSC of a NiTi thin film deposited on an aluminum substrate.

The as-deposited NiTi thin film was amorphous and was post-annealed to crystallize. From DSC measurements, the rhombohedral "R-phase", martensite and austenite start and finish temperatures ($R_s$, $R_f$, $M_s$, $A_s$, respectively) were determined and the DSC curves are shown in FIG. 3. The composition and phase transformation temperature of the two types of NiTi films are listed in Table I. For Specimen S1, $A_s$ was 8° C. and the $A_f$ was 37° C. in the heating cycle; $R_s$ was 34° C. and $R_f$ was 4° C. In the cooling cycle.

Figure 4:
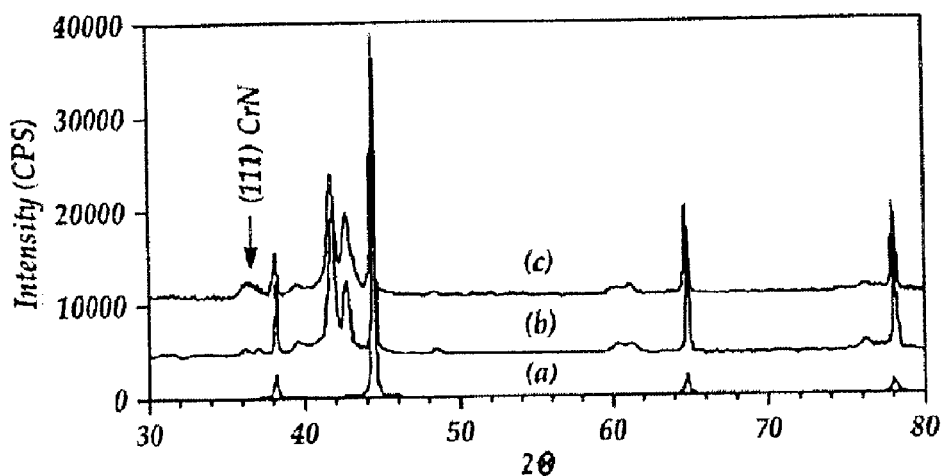
FIG. 4 is an X-ray diffraction spectrum of various materials prepared according to an embodiment of the method disclosed herein.

Specimen S1 was found to consist of both austenite phase and R-phase at ambient temperature. The x-ray diffraction (XRD) pattern of the aluminum substrate and S1 thin film are shown in FIGS. 4A and 4B. The NiTi austenite phase was determined to have a B2 structure and to show a (110) diffraction peak 2 theta=43°. The austenite (110) peak was split when transformed into rhombohedral R-phase. The peak at 2 theta=42° was the diffraction of the (110) plane of R-phase.

Specimen S2 was found to have a much higher transformation temperature than that of Specimen S1. The martensite finish temperature of Specimen S2 was higher than ambient temperature, which indicates that Specimen S2 consisted of martensite phase material at room temperature.

Figure 5:
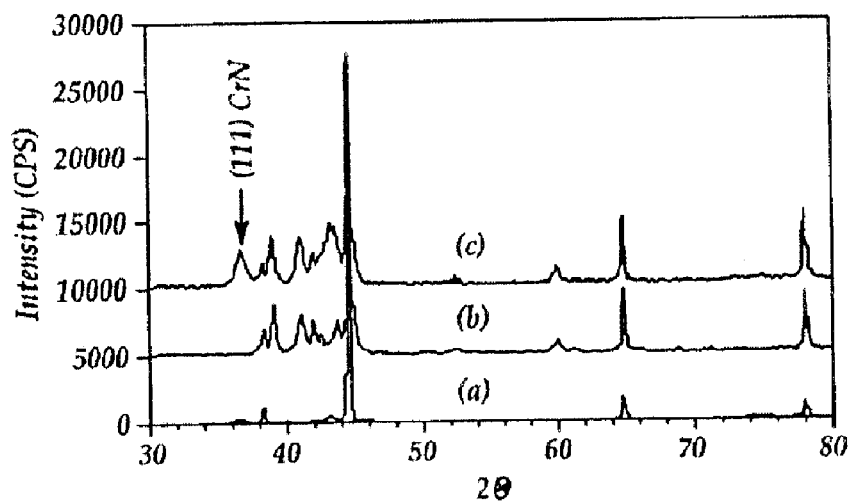
FIG. 5 is an X-ray diffraction spectrum of various additional materials prepared according to an embodiment of the method disclosed herein.

The XRD of Specimen S2 thin film is shown in FIG. 5B, which indicates the monoclinic structure of the martensitic NiTi.

EXAMPLE II

Figure 6:
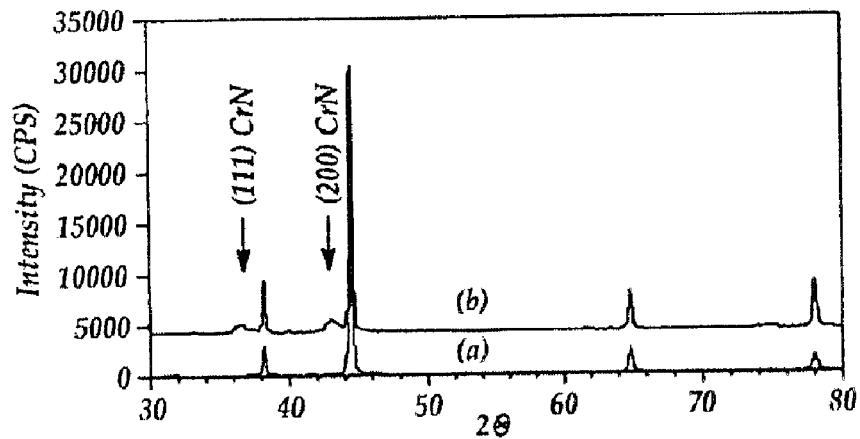
FIG. 6 is an X-ray diffraction spectrum of various aluminum substrates having a CrN coating.

In order to evaluate the effectiveness of interposition of materials containing shape memory allay in hard coating of "soft" substrates to protect the soft substrate, CrN coatings of 1 μm thick were deposited on the top of Specimen S1, Specimen S2, and an aluminum specimen of 6061-T6 aluminum. The corresponding X-ray diffraction (XRD) patterns of the CrN coating are shown in FIG. 4C, FIG. 5C and FIG. 6B, respectively. The weak peaks at 2 theta=37.2° and 2 theta=43.6° are indexed as (111) and (200) diffraction of CrN.

Indentation properties were obtained and analyzed. Indentation properties of the coatings and substrate, for example, hardness, Young's modulus, and recovery ratio, were obtained by instrumented indentation experiments. The hardness and reduced Young's modulus were obtained from the maximum load and initial unloading slope of the unloading curve using the method outlined by Oliver and Pharr. The work recovery ratio, $\eta_w$, is defined as the ratio of reversible work to total work:

$$\eta_w = \frac{W_e}{W_t} = \frac{\int_{h_r}^{h_{max}} P dh}{\int_o^{h_{max}} PDF} \quad (1)$$

where $W_t$ is the total work done during loading while $W_e$ is the reversible work during unloading; $h_{max}$ is the maximum penetration depth while $h_f$ is the residual indentation depth after unloading. The depth recovery ratio, $\eta_h$ is defined as the recoverable indentation depth to the total indentation;

TABLE I

Composition and phase transformation temperature of the NiTi thin films

| Specimen ID | Film Composition | Target Composition | $A_q$ (° C.) | $A_r$ (° C.) | $R_s$ (° C.) | $R_f$ (° C.) | $M_s$ (° C.) | $M_f$ (° C.) | Comments |
|---|---|---|---|---|---|---|---|---|---|
| S1 | Ni 51.8 at %-Ti | Ni 49.8 at %-Ti | 8 | 37 | 34 | 4 | / | / | Superelastic |
| S2 | Ni 49.5 at %-Ti | Ni 48.0 at %-Ti | 87 | 96 | / | / | 62 | 28 | Shape Memory |

$$\eta_h = \frac{h_{max} - h_r}{h_{max}} \quad (2)$$

The hardness, H/E, $\eta_w$ and $\eta_h$ represent the strength and the elasticity of the materials.

Figure 7:
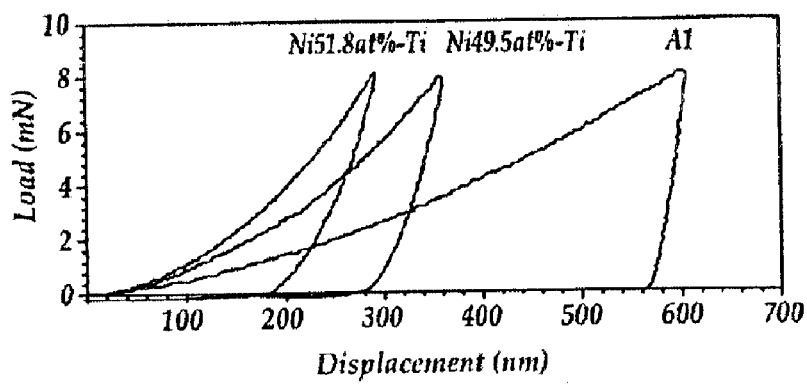
FIG. 7 depicts load displacement curves of an aluminum substrate having a CrN coating and materials prepared according an embodiment of the method disclosed herein.

The load-displacement curves of Berkovich indentation tests of the aluminum substrate, Specimen S1 and Specimen S2 are shown in FIG. 7. Properties obtained from the nanoindentation test are listed in Table II. The hardness of the specimens decreases in the order of Specimen S1 (austenite), Specimen S2 (martensite) and aluminum. The Young's moduli of NiTi thin films are close to that of the aluminum substrate. Specimen S1 (austenite) thin film showed the highest work and depth recovery ratio, which is consistent with indentation studies and characteristics of bulk austenite and martensitic NiTi material.

TABLE II

Comparison of the Nanoindentation Properties of the Aluminum Substrate and the Ni 51.8 at %-Ti and Ni 49.5 at %-Ti Interlayer

| Materials | H (Gpa) | E (Gpa) | H/E* | $\eta_w$ | $\eta_h$ |
|---|---|---|---|---|---|
| 6061-T6 Al | 0.94 | 77.6 | 0.0118 | 0.064 | 0.07 |
| Ni 51.8 at %-Ti (S1) | 4.67 | 95.0 | 0.0488 | 0.38 | 0.38 |
| Ni 49.5 at %-Ti (S2) | 2.42 | 89.3 | 0.0264 | 0.226 | 0.234 |

(*H/E is elastic strain to failure)

Figure 8A:
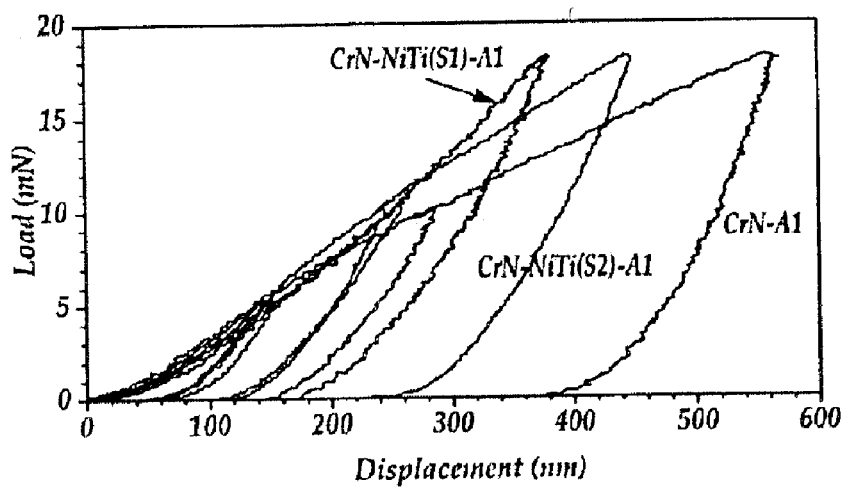
FIGS. 8A and 8B are load-displacement curves of Berkovich nanoindentation tests at various loads.
Figure 8B:
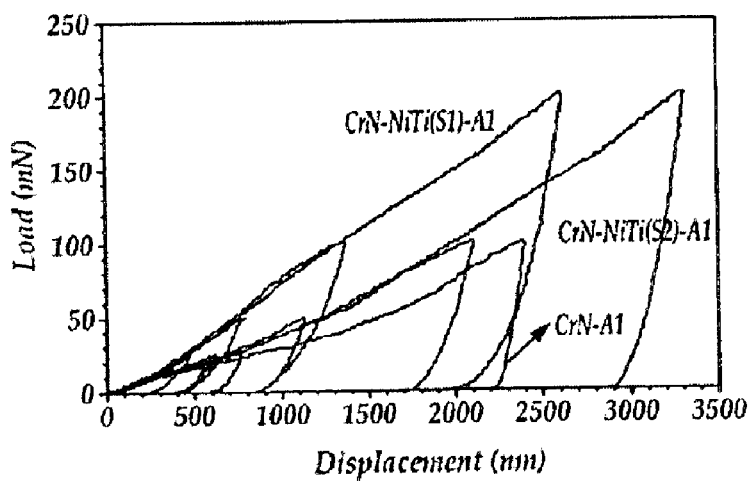

The load-displacement curves of Berkovich nanoindentation tests at various loads are shown in FIGS. 8A–8B. It was found that the loading curve of CrN—Al began to deviate from the loading curve of Specimen S1 CrN—NiTi—Al at an indentation depth of about 200 nm, which is one-fifth of the film thickness. The residual indentation depth of CrN—NiTi—Al (Specimen S1) was smaller than that of CrN—Al and CrN—NiTi—Al (Specimen S2) when compared at similar indentation depths. Without being bound to any theory, it is believed that the flat region in the loading curve of CrN—Al was related to the micro-cracking or delamination of the coating because indentation displacement increased rapidly ith little increase in force when cracking or delamination occurred.

Figure 9A:
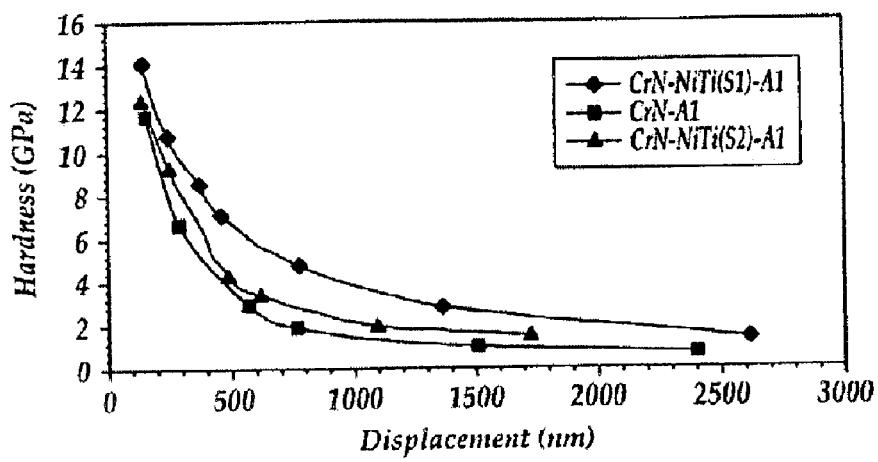
FIGS. 9A and 9B are plots of effective hardness, work recovery ratio and depth recovery ratio that were obtained from the load-displacement curve of FIGS. 8A and 8B.
Figure 9B:
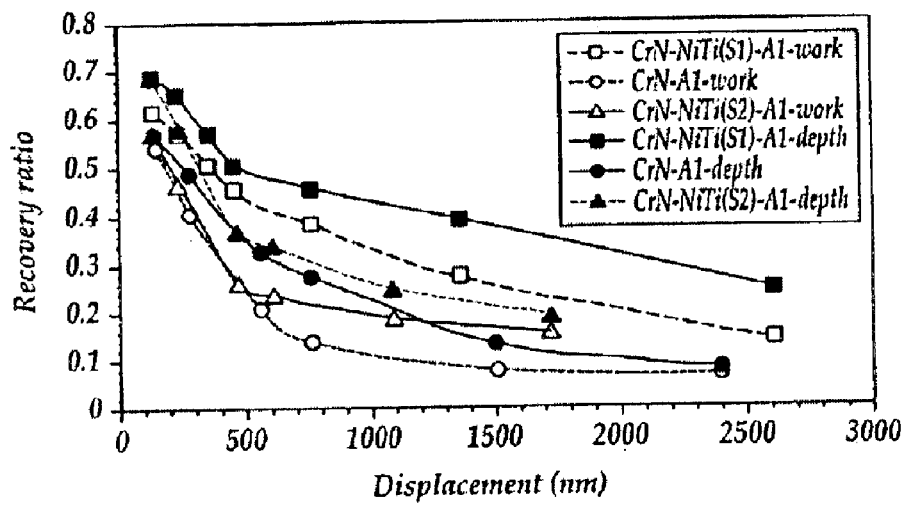

The effective hardness, work recovery ratio and depth recovery ratio were obtained from the load-displacement and plotted in FIGS. 9A and 9B. Of particular interest were indentation depths less than 1000 nm because the hard coating was still the material in contact with the indenter at this depth. The effective hardness and the work and depth recovery ratio of CrN—Al and CrN—NiTi—Al (Specimen S2) decreased faster than that of CrN-NiTi—Al (Specimen S1) with increasing indentation depth.

For a hard coating—soft substrate system, the compliant substrate shows the substrate effect at a smaller indentation depth. The long-range stress field under the indenter can lead to plastic deformation of the soft substrates and it can also create a shear stress at the interface due to the mechanical mismatch. Both phenomena will accelerate the failure of the coating.

Figure 10:
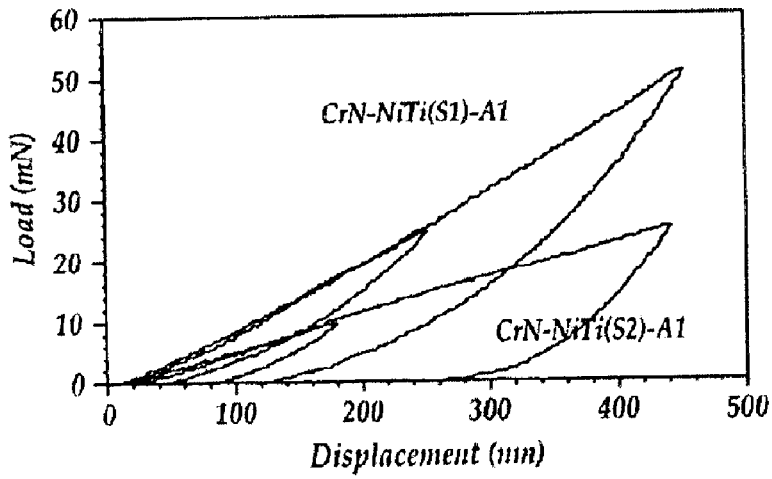
FIG. 10 depicts load-displacement curves of spherical indentation tests conducted on materials prepared according to an embodiment of the present invention.

Load-displacement curves of spherical indentation tests on CrN—NiTi—Al (Specimen S1) and CrN—NiTi—Al (Specimen S2) are shown in FIG. 10. As can be seen from FIG. 10, CrN-NiTi—Al (Specimen S1) shows much larger elastic recovery effect than CrN—NiTi—Al (Specimen S2). For Specimen S1, the work recovery ratio deceased from 0.67 to 0.55 and the depth recovery ratio decreased from 0.82 to 0.73 with an increasing indentation depth from 250 nm to 450 nm. For Specimen S2, the work recovery ratio decreased from 0.5 to 0.26 and the depth recovery ratio decreased from 0.59 to 0.42 with an increasing indentation depth from 180 nm to 450 nm. The recovery ratio of the specimen with the austenite interlayer was larger and decreased more slowly. The microscopic superelasticity of the austenite NiTi has been studied recently and a similar result has been observed.

EXAMPLE III

Figure 11A:
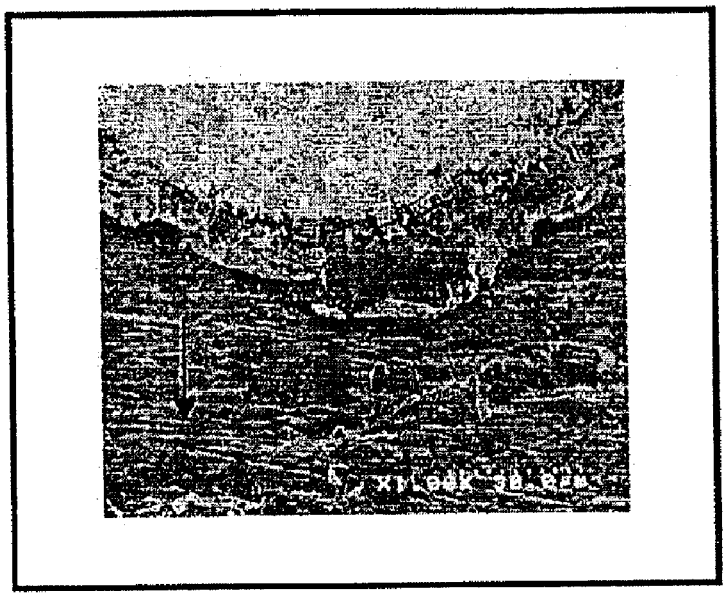
FIGS. 11A and 11B are SEM images of a scratch on a CrN—Al sample with the arrow denoting scratch direction.
Figure 11B:
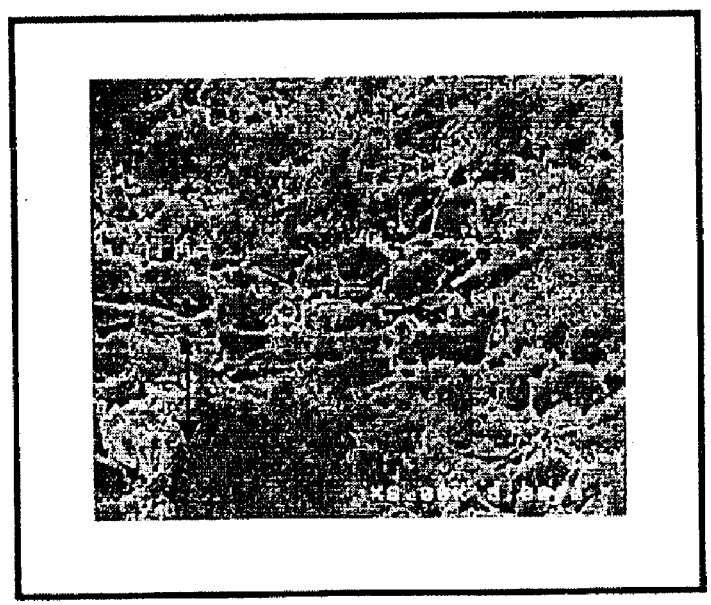

In order to ascertain adhesion strength, the CrN—Al sample, Specimen S1 (CrN—NiTi—Al) and Specimen S2 (CrN—NiTi—Al) were compared qualitatively by observing scratches using scanning electron microscopy (SEM). The SEM images of the end and inside of the scratch on the CrN—Al sample are shown in FIGS. 11A and 11B. Flakes of delaminated CrN coating at the scratch end and microcracks inside the scratch track were observed.

Figure 12A:
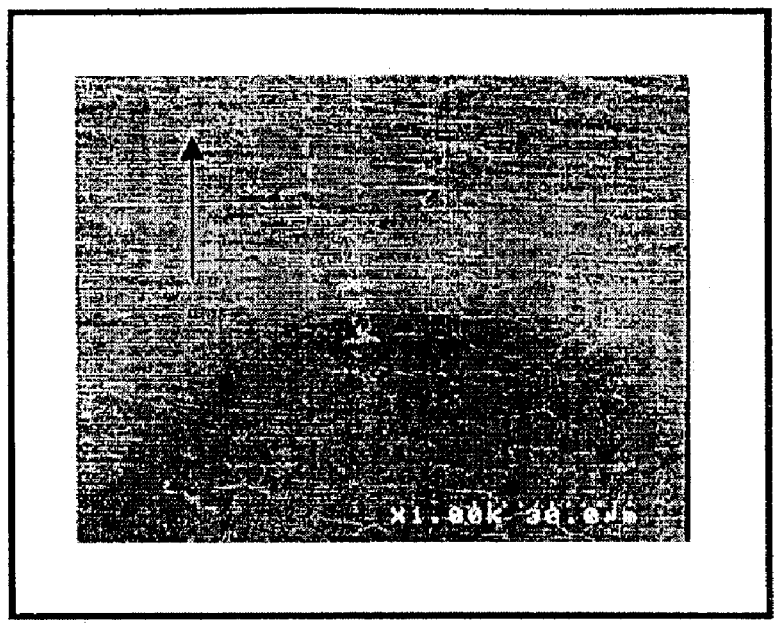
FIGS. 12A and 12B are SEM images of a scratch made on a sample prepared according to an embodiment as disclosed herein with the arrow denoting scratch direction.
Figure 12B:
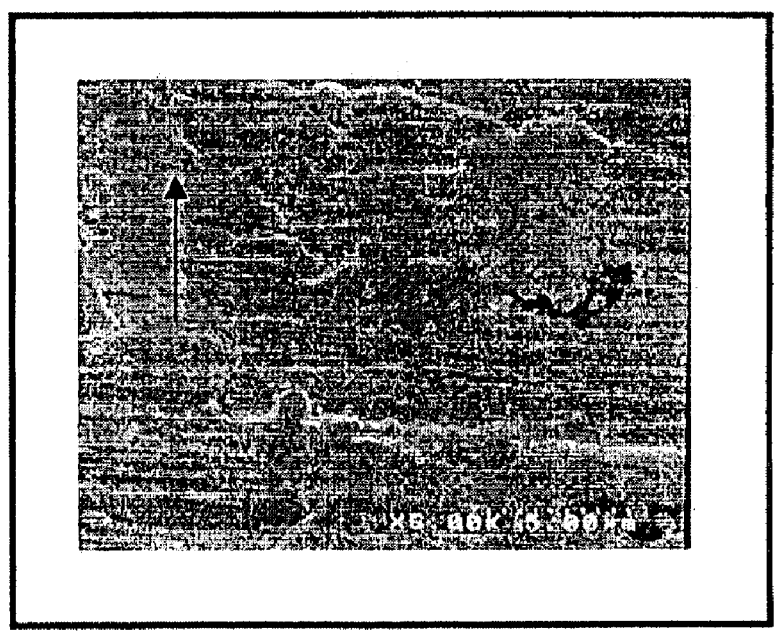

As a comparison, the SEM Images of end and inside of the scratch on (Specimen S1) CrN—NiTi—Al sample are shown in FIGS. 12A and 12B. No delamination occurred at the end and no crack formed inside the scratch. Some micro-cracks were observed along the edge of the scratch. These observations indicate that the N151.8at %-Ti interlayer, which consists of austenite phase material and has superelasticity, provides improved adhesion between a layer material such as a hard CrN coating and soft aluminum substrate.

Figure 13A:
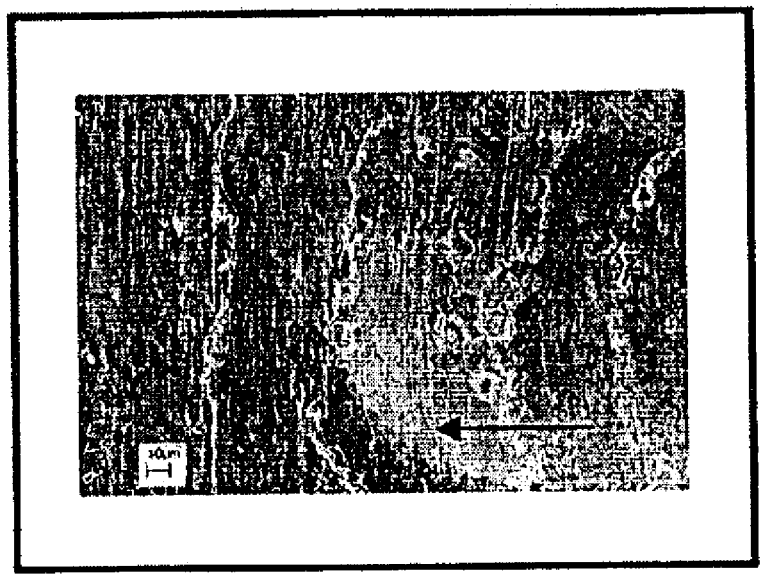
FIGS. 13A and 13B are SEM images of a scratch made on a comparison sample with the arrow denoting scratch direction.
Figure 13B:
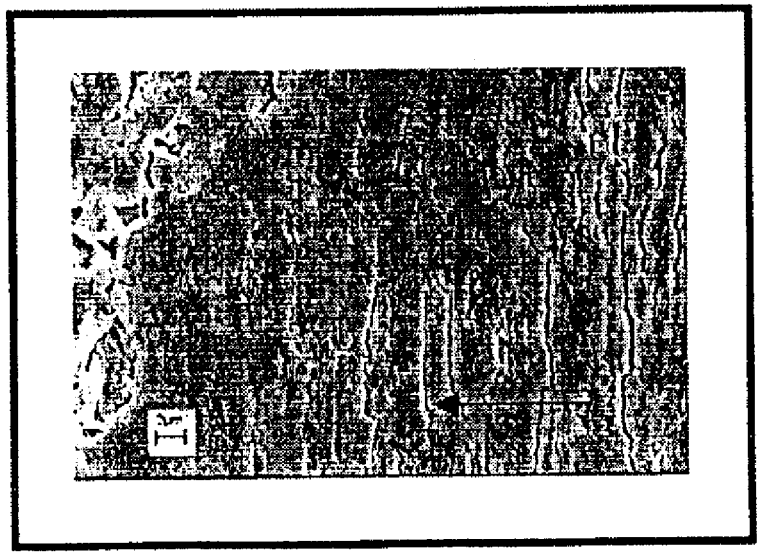

To further understand the mechanism for the improved adhesion, the influence of the Ni49.5at %-Ti present as the interlayer in Specimen S2 on the adhesion of the CrN was also studied by scratch test. The N149.5at %-Ti was martensitic and possessed no superelasticity. The SEM Images of the end and inside of the scratch on Specimen S2 CrN—NiTi—Al sample are shown in FIGS. 13A and 13B. Both delamination and cracking were observed at the end of and inside the scratch. Since there was little compositional difference between Specimen S1 (Ni51.8at % Ti) and Specimen S2 (Ni149.5 at %-Ti), the different adhesion behavior was attributed to the differences in mechanical properties. The interlayer of Specimen S1 exhibited a much higher work and depth recovery ratio than Specimen S2, due to its reversible austenite to martensite transformation.

Without being bound to any theory, it is believed that the superelastic intermediate layer can accommodate strain around the interface by recoverable elastic deformation. Since part of energy was absorbed by the elastic deformation of the interlayer, less energy was available for delaminating and cracking, thereby resulting in improved adhesion.

FIGS. 14A and 14B depict how the superelastic intermediate layer can accommodate the strain in the intermediate layer and at the interface by elastic deformation. The deformation disappears when the load is removed. In the tests conducted and discussed, there was no evidence of residual deformation when a superelastic material was used as an intermediate layer. The shape memory alloy functioned like elastomeric polymer adhesive.

EXAMPLE IV

Figure 15B:
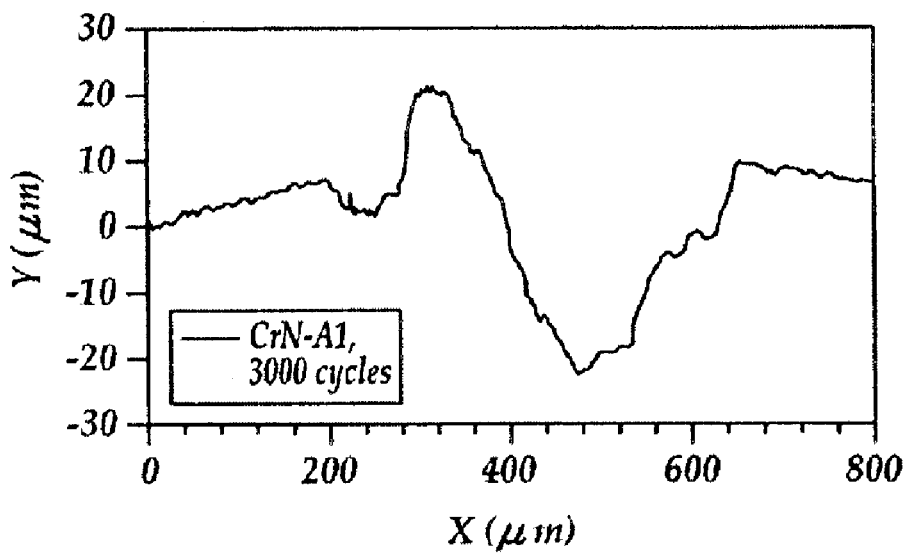

The durability and wear rate of the specimens were also measured using the pin-on-disk test. FIGS. 15A and 15B present the wear results of CrN—Al. FIG. 15A presents the friction coefficient while FIG. 15B presents the wear track after 3000 cycles. The CrN coating failed after 3,000 cycles as indicated by a sudden increase in the friction coefficient. A deep wear scar of about 20 $\mu$m was produced as a result of the test.

Figure 16A:
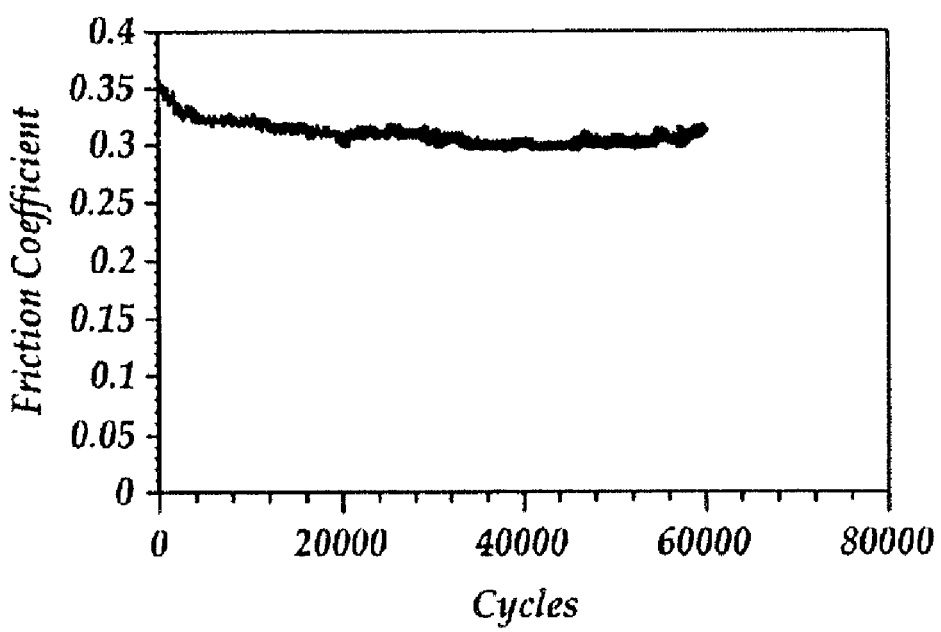
FIGS. 16A and 16B are graphic results of coefficient of friction and wear track for the wear results of material prepared according to an embodiment as disclosed herein.
Figure 16B:
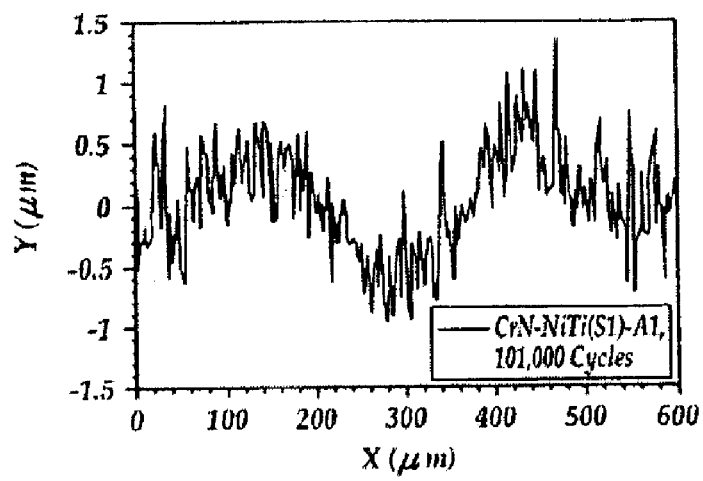

FIGS. 16A and 16B present wear results of Specimen S1 (CrN—NiTi—Al). The specimen exhibited a low and stable friction coefficient. The CrN coating did not evidence failure fail after 101,000 cycles. The wear rate was determined to be about $5.4 \times 10^{-4}$ µm².

Figure 17A:
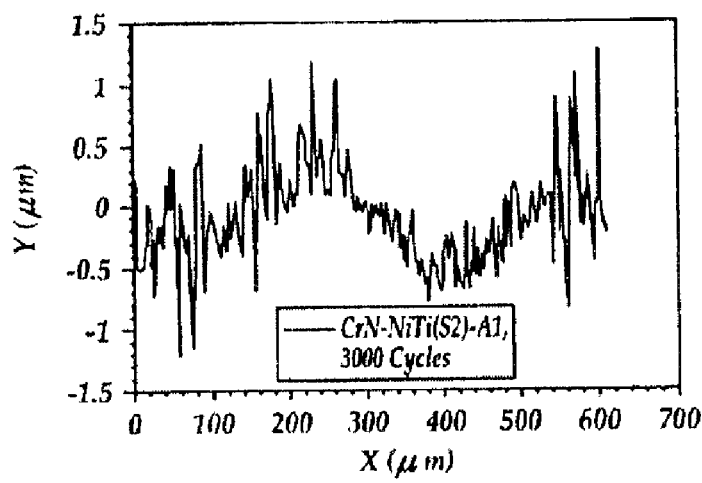
FIGS. 17A and 17B are graphic results of wear tracks for the wear results of a comparison material.
Figure 17B:
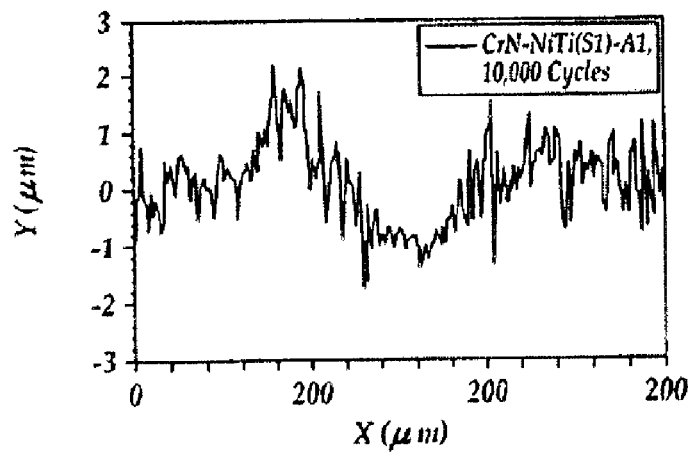

As a comparison, the wear results of Specimen 52 (CrN—NiTi—Al) is shown in FIGS. 17A and 17B after 3000 cycles and 10,000 cycles. The wear rate was about $2.0 \times 10^{-2}$ µm², which was about 40 times faster than that of Specimen S1(CrN—NiTi—Al) after 10,000 cycles.

Without being bound to any theory, it is believed that the excellent wear resistance of Specimen S1 (CrN—NiTi—Al) was related to the indentation and adhesion behavior evidenced. Specimen S1 (CrN—NiTi—Al) evidenced high effective hardness, high recovery ratio, and improved adhesion. Both hardness and H/E (elastic strain to failure) have merits in wear resistance. Materials with high hardness and high H/E will usually provide better wear resistance and adhesion, which can prevent premature coating failure.

While the invention has been described in connection with what is presently considered to be the most practical and preferred embodiment, it is to be understood that the invention is not limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as permitted under the law.

What is claimed is:

1. A method for adhering at least two materials, the materials having at least one characteristic dissimilarity, the method comprising the step of interposing at least one intermediate layer between the two materials, the intermediate layer containing at least one shape memory alloy that provides an adhesion of the at least two materials better than that of the at least two materials without the intermediate layer.

2. The method of claim 1 wherein the shape memory alloy exhibits superelasticity under an ambient temperate of operation for the associated two materials.

3. The method of claim 2 wherein the shape memory alloy exhibits superelasticity under loads encountered in friction and wear.

4. The method of claim 3 wherein the superelasticity of the shape memory alloy is exhibited at a temperature between −40° C. and 140° C.

5. The method of claim 2 wherein the at least two materials to be adhered exhibit differences in at least one of material hardness, elastic modulus, residual stress, and thermal expansion coefficients.

6. The method of claim 2 wherein the materials to be adhered are components of a work piece, the workpiece being under loads encountered in friction and wear.

7. The method of claim 2 wherein a second material of the at least two materials is deposited, and the second material exhibits internal stress from being deposited.

8. The method as defined in claim 7 wherein the deposition of the second material is accomplished by one of vapor deposition and plasma deposition.

9. The method of claim 2 wherein the shape memory alloy is a superelastic alloy containing at least one of an iron-based alloy, a copper-based alloy, and a nickel-based alloy.

10. The method of claim 2 wherein the shape memory alloy includes iron and at least one of manganese, silicon, chromium, and nickel.

11. The method of claim 2 wherein the shape memory alloy includes copper and at least one of zinc, aluminum, nickel and beryllium.

12. The method of claim 2 wherein the shape memory alloy includes nickel and at least one of titanium, copper, niobium, gold, palladium, platinum, zirconium, and hafnium.

13. The method of claim 2 wherein the shape memory alloy is at least one of iron-maganese silicon alloys, iron-chromium-nickel alloys copper-zinc-aluminum alloys; copper-nickel-aluminum alloys, copper-beryllium-alum alloys, and nickel-titanium based alloys.

14. The method of claim 2 wherein the shape memory alloy includes at least one of nickel-titanium-copper alloys and nickel-titanium-niobium alloys.

15. The method of claim 1 wherein the characteristic dissimilarity between the at least two materials is at least one of hardness, elastic modulus, residual stress, and thermal expansion.

16. The method of claim 15 wherein at least one of the at least two materials is a substrate containing at least one of ceramic compounds, polymer composites, metal matrix composites, aluminum alloys, magnesium alloys, and copper alloys.

17. The method of claim 1 wherein the intermediate layer interposed has a thickness between about 0.5 nanometers and 5 microns.

18. The method of claim 17 wherein at least one of the materials to be bonded is a thin film.

19. The method as defined in claim 1 wherein interposing the at least one intermediate layer is accomplished by one of vapor deposition and plasma deposition.

20. A method for adhering at least two materials, the materials having at least one characteristic dissimilarity, the method comprising the step interposing at least one intermediate layer between the two materials, the intermediate layer containing at least one shape memory alloy, wherein the intermediate layer is of a different composition than, both of the two materials, wherein the characteristic dissimilarity between the two materials is at least one of hardness, elastic modulus, internal material stress and thermal expansion, and wherein at least one of the materials contains at least one of a carbon-based coating material, a nitride-based coating material, a carbide-based coating material, an oxide-based coating material, and a boride-based coating material.

21. The method of claim 20 wherein the shape memory alloy exhibits superelasticity under an ambient temperature of operation or the associated two materials.

22. The method of claim 21 wherein the shape memory alloy exhibits superelasticity under loads encountered in friction and wear.

23. The method of claim 21 wherein the shape memory alloy is a superelastic alloy containing at least one of an iron-based alloy, a copper-bases alloy, and a nickel-based alloy.

24. The method of claim 23 wherein the iron-based shape memory alloy includes iron and at least one of manganese, silicon, chromium, and nickel.

25. The method of claim 23 wherein the copper-based shape memory alloy includes copper and at least one of zinc, aluminum, nickel and beryllium.

26. The method of claim 23 wherein the nickel-based shape memory alloy includes nickel and at least one of titanium, copper, niobium, gold, palladium, platinum, zirconium, and hafnium.

27. The method of claim 21 wherein the shape memory alloy is at least one of iron-manganese-silicon alloys, iron-chromium-nickel alloys, copper-zinc-aluminum alloys, copper-nickel-aluminum alloys, copper-beryllium-aluminum alloys, and nickel-titanium based alloys.

28. The method of claim 27 wherein the nickel-titanium based alloy includes at least one of nickel-titanium-copper alloys and nickel-titanium-niobium alloys.

29. A method for adhering at least two materials, the materials having at least one characteristic dissimilarity, the method comprising the step of interposing at least one intermediate layer between the two materials, the intermediate layer containing at least one shape memory alloy, wherein the characteristic difference between the two materials is at least one of hardness, elastic modulus, internal material stress, and thermal expansion, wherein the intermediate layer interposed has a thickness between 10 nanometers and 500 microns, wherein at least one of the materials to be bonded is a thin film, and wherein the thin film has a hardness greater than 5 GPa and includes at least one of diamond-like carbon, diamond, aluminum nitride, zirconium nitride, silicon carbide, tungsten carbide and aluminum oxide.

30. The method of claim 29 wherein the thin film is positioned on materials which include high-strength steel and tungsten carbide.

31. The method of claim 29 wherein the shape memory alloy exhibits superelasticity under an ambient temperature of operation for the associated two materials.

32. The method of claim 31 wherein the shape memory alloy exhibits superelasticity under loads encountered in friction and wear.

33. The method of claim 31 wherein the shape memory alloy is a superelastic alloy containing at least one of an iron-based alloy, a copper-based alloy, and a nickel-based alloy.

34. The method of claim 33 wherein the iron-based shape memory alloy includes iron and at least one of manganese, silicon, chromium, and nickel.

35. The method of claim 33 wherein the copper-based shape memory alloy includes copper and at least one of zinc, aluminum, nickel and beryllium.

36. The method of claim 33 wherein the nickel-based shape memory alloy includes nickel and at least one of titanium, copper, niobium, gold, palladium, platinum, zirconium, and hafnium.

37. The method of claim 31 wherein the shape memory alloy is at least one of iron-manganese-silicon alloys, iron-chromium-nickel alloys, copper-zinc-aluminum alloys, copper-nickel-aluminum alloys, copper-beryllium-alum alloys, and nickel-titanium based alloys.

38. The method of claim 37 wherein the nickel-titanium based alloy includes at least one of nickel-titanium-copper alloys and nickel-titanium-niobium alloys.

39. A method for adhering at least two materials, the materials having at least one characteristic dissimilarity, the method comprising the step of interposing at least one intermediate layer between the two materials, the intermediate layer containing at least one shape memory alloy, wherein at least one of the materials contains at least one of a carbon-based coating material, a nitride-based coating material, a carbide-based coating material, an oxide-based coating material, and a boride-based coating material.

* * * * *